(12) United States Patent
Sekol et al.

(10) Patent No.: US 10,190,833 B2
(45) Date of Patent: Jan. 29, 2019

(54) MECHANICALLY CONFORMABLE MICRO-HEAT EXCHANGERS AND METHODS FOR USE IN THERMAL MANAGEMENT OF TARGET COMPONENTS

(71) Applicant: GM Global Technology Operations LLC, Detroit, MI (US)

(72) Inventors: Ryan C. Sekol, Grosse Pointe Woods, MI (US); Teresa J. Rinker, Royal Oak, MI (US); Debejyo Chakraborty, Novi, MI (US); Jeffrey A. Abell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 333 days.

(21) Appl. No.: 15/132,931

(22) Filed: Apr. 19, 2016

(65) Prior Publication Data

US 2016/0231071 A1   Aug. 11, 2016

Related U.S. Application Data

(63) Continuation-in-part of application No. 15/017,067, filed on Feb. 5, 2016, and a continuation-in-part of
(Continued)

(51) Int. Cl.
*F28F 3/02* (2006.01)
*F28F 3/12* (2006.01)
(Continued)

(52) U.S. Cl.
CPC ........... *F28F 21/062* (2013.01); *F28D 15/00* (2013.01); *F28F 3/02* (2013.01); *F28F 3/12* (2013.01);
(Continued)

(58) Field of Classification Search
CPC ......... B29C 65/18; B29C 65/00; B29C 66/71; F28F 1/42; F28F 19/06; F28F 21/08; F28F 21/062; B23P 15/26
(Continued)

(56) References Cited

U.S. PATENT DOCUMENTS 7,832,613 B2 * 11/2010 Hanlon .............. B23K 20/1245
228/112.1
8,541,875 B2    9/2013 Bennion et al.
(Continued)

OTHER PUBLICATIONS

Carlos F. Lopez et al., "Exploring the Efficacy of Nanofluids for Thermal Management in Lithium-Ion Battery Systems", May 14, 2014, ECS Meeting Abstracts, ECS Digital Library.
(Continued)

*Primary Examiner* — Michael J Brown
(74) *Attorney, Agent, or Firm* — Tiffany N. Logan; Parks IP Law LLC

(57) ABSTRACT

A mechanically conformable micro-heat exchanger for use in managing temperature of a subject component. The exchanger includes a flexible fluid tube. In various embodiments, the tube is connected to a flexible substrate, such as by a flexible polymer. The exchanger can be changed manually from an initial shape to a first shape to conform to a shape of the subject component. The flexible fluid tube is configured to channel heat-transfer fluid through a heat-transfer tube section of the tube. The heat-transfer fluid is configured to cool or heat the subject component when, in operation of the mechanically conformable micro-heat exchanger, the heat-transfer fluid is channeled through the heat-transfer tube section.

16 Claims, 4 Drawing Sheets

Related U.S. Application Data application No. 15/017,092, filed on Feb. 5, 2016, and a continuation-in-part of application No. 15/017,106, filed on Feb. 5, 2016, now Pat. No. 10,031,499.

(60) Provisional application No. 62/112,620, filed on Feb. 5, 2015, provisional application No. 62/112,624, filed on Feb. 5, 2015, provisional application No. 62/112,629, filed on Feb. 5, 2015.

(51) Int. Cl.

| | |
|---|---|
| *F28D 15/00* | (2006.01) |
| *F28F 21/06* | (2006.01) |
| *F28F 23/00* | (2006.01) |
| *F28F 27/00* | (2006.01) |
| *H01M 10/6556* | (2014.01) |
| *H01M 10/0525* | (2010.01) |
| *H01M 10/625* | (2014.01) |
| *F21V 29/58* | (2015.01) |
| *F21V 29/503* | (2015.01) |
| *F21Y 115/10* | (2016.01) |
| *F28F 21/08* | (2006.01) |

(52) U.S. Cl.
CPC .............. *F28F 23/00* (2013.01); *F28F 27/00* (2013.01); *H01M 10/6556* (2015.04); *F21V 29/503* (2015.01); *F21V 29/59* (2015.01); *F21Y 2115/10* (2016.08); *F28F 21/08* (2013.01); *F28F 2250/08* (2013.01); *F28F 2255/02* (2013.01); *F28F 2260/02* (2013.01); *F28F 2275/025* (2013.01); *H01M 10/0525* (2013.01); *H01M 10/625* (2015.04); *Y02P 70/54* (2015.11)

(58) Field of Classification Search
USPC .......................................... 700/282; 429/50
See application file for complete search history.

(56) References Cited

U.S. PATENT DOCUMENTS

| | | | |
|---|---|---|---|
| 8,968,820 B2 | 3/2015 | Zhamu et al. | |
| 2009/0305135 A1 | 12/2009 | Shi et al. | |
| 2012/0186789 A1 | 7/2012 | Sedarous et al. | |
| 2012/0270077 A1* | 10/2012 | Koetting | H01M 10/48 429/50 |

OTHER PUBLICATIONS

Yang Li et al., "Liquid Cooling of Tractive Lithium Ion Batteries Pack with Nanofluids Coolant", Journal of Nanoscience and Nanotechnology, Apr. 4, 2015, pp. 3206-3211, vol. 15, No. 4, American Scientific Publishers.
"Virtual Hybrid Battery System", Impact Lab, Jun. 29, 2013.
Else Tennessen, "Nanofluids improve performance of vehicle components", Argonne National Laboratory, Mar. 9, 2012.
"Smart heating and cooling with nanofluids", Innovations Report, Forum for Science, Industry and Business, Mar. 12, 2009.
Ali Ijam et al., Nanofluid as a coolant for electronic devices (cooling of electronic devices), ScienceDirect, Applied Thermal Engineering, Jan. 2012, pp. 76-82, vol. 32.
P. Sivashanmugam, "Application of Nanofluids in Heat Transfer", InTech.
B. Kirubadurai et al., "Heat Transfer Enhancement of Nano Fluids—A Review", IJRET: International Journal of Research in Engineering and Technology, Jul. 2014, pp. 483-486, vol. 3, No. 7.
Li Jiang et al., "Thermo-Mechanical Reliability of Nano-Silver Sintered Joints versus Lead-Free Solder Joints for Attaching Large-Area Silicon Devices", SAE International, Nov. 2, 2010.
D. Shin et al., "Enhanced Specific Heat Capacity of Molten Salt-Metal Oxide Nanofluid as Heat Transfer Fluid for Solar Thermal Applications", SAE International, Nov. 2, 2010.
G. Huminic et al., "The Cooling Performances Evaluation of Nanofluids in a Compact Heat Exchanger", SAE International, Apr. 16, 2012.
"Nanofluid Tapped to Cool Servers", Electronics Cooling, Liquid Cooling, Sep. 14, 2010.
Saeil Jeon et al., "Investigation of Thermal Characteristics of Nanofluids During Flow in a Micro-channel Using an Array of Surface Temperature-Nano-Sensors", SAE International, Nov. 2, 2010.
Robert P. Scaringe et al., "The Heat Transfer Effects of Nanotube Surfaces Treatments and a Means for Growing the Nanotube Coated Surfaces", SAE International, Nov. 7, 2006.
J.R. Patel et al., "Effect of Nanofluids and Mass Flow Rate of Air on Heat Transfer Rate in Automobile Radiator by CFD Analysis", IJRET: International Journal of Research in Engineering and Technology, Jun. 2014, p. 25, vol. 3, No. 6.
Purna Chandra Mishra et al., "Application and Future of Nanofluids in Automobiles: An Overview on Current Research", ResearchGate, 2nd KIIT International Symposium on Advances in Automotive Technology.
Yi-Hsuan Hung et al., "Multiwalled Carbon Nanotube Nanofluids Used for Heat Dissipation in Hybrid Green Energy Systems", Journal of Nanomaterials, 2014, Hindawi Publishing Corporation.
Ching-Song Jwo et al., "Performance of Overall Heat Transfer in Multi-Channel Heat Exchanger by Alumina Nanofluid", ScienceDirect, Elsevier, Journal of Alloys and Compounds, Aug. 2010, pp. S385-S388, vol. 504, Supplement 1.
"Powertrain Thermal Management", Automotive Research Center.
Nazih A. Bin-Abdun et al., "The Performance of a Heat Exchanger Designed for Cooling Electric Vehicle Car Battery System by Use Base Fluid and Nano-Fluid", ResearchGate, Mar. 2015.
"Experimental Thermal and Fluid Science", ScienceDirect, Sep. 2014, pp. 1-434, vol. 57.
"FleX Silicon-on-Polymer", American Semiconductor, http://www.americansemi.com/FleX.html.
Joachim N. Burghartz, "Make Way for Flexible Silicon Chips", IEEE Spectrum, Feb. 25, 2013, http://spectrum.ieee.org/semiconductors/materials/make-way-for-flexible-silicon-chips.
Jhonathan Prieto Rojas et al., "Transformational Silicon Electronics", ACS Publications, ACSNano, Jan. 29, 2014, pp. 1468-1474, vol. 8, No. 2.

\* cited by examiner

MECHANICALLY CONFORMABLE MICRO-HEAT EXCHANGERS AND METHODS FOR USE IN THERMAL MANAGEMENT OF TARGET COMPONENTS

TECHNICAL FIELD

The present disclosure relates generally to systems and methods for managing thermal conditions of various structures and, more particularly, to mechanically conformable micro-heat exchangers comprising a flexible substrate and flexible channels carrying a heat-transfer fluid for managing thermal conditions of subject structures having any of a wide variety of shapes.

BACKGROUND

Many electronic devices, such as lighting arrangements and batteries operate optimally when kept within a target temperature range. Lighting systems can heat up quickly and some varieties can overheat without adequate cooling arrangements.

Regarding lighting, an example subject component to be temperature managed is a component of a light-emitting-diode (LED) system.

Regarding batteries, such as lithium-ion batteries, getting the battery quickly to, and keeping the battery within, the target range involves selective heating and cooling the battery, respectively. This includes locating the battery adjacent pre-heating or cooling elements.

While helpful, conventional techniques have shortcomings including taking up an undesirably high amount of space, high cost in some cases, and not heating or cooling as efficiently or effectively as desired.

SUMMARY

The present technology relates in various aspects to mechanical conformable mechanically conformable micro-heat exchangers comprising a flexible substrate and flexible channels carrying a nanofluid or other heat-transfer fluid. The substrate in various embodiments includes flexible silicon or another flexible polymer.

Each mechanically, or physically, conformable mechanically conformable micro-heat exchanger is sufficiently mechanically flexible, to conform to shapes of multiple, distinctly shaped structures to be temperature controlled, to enable snug fitting between the conformable mechanically conformable micro-heat exchanger and the structure.

Example structures to be temperature-controlled include, but are far from being limited to, lighting systems, such as LED arrangements, and automotive battery components.

The temperature control enabled by the present technology in various embodiments includes cooling or heating. In some embodiments, a single mechanically conformable micro-heat exchanger is configured and implemented to selectively cool or heat the subject structure.

In various embodiments, each mechanically conformable micro-heat exchanger comprises a flexible substrate connected to a flexible channel configured to carry a heat-transfer fluid. The flexible arrangement can by virtue of its conformable structuring be positioned snuggly at any of multiple positions within and/or adjacent a subject structure to be temperature controlled. In some implementations, a mechanically conformable micro-heat exchanger can, also by its conformable configuration, be positioned within and/or adjacent any of multiple distinctly shaped structures to be temperature controlled.

The mechanically conformable micro-heat exchangers, in various embodiments, use a custom-made or pre-selected fluid, such as a nanofluid, or a microfluid having target characteristics. Target characteristics can include, for instance, super heating and/or super cooling, or an ability to absorb, carry, and/or deliver heat to or from the subject structure, such as a battery component, with much greater efficiency than conventional coolants or refrigerants, such as traditional engine coolant.

Example battery components to be cooled include a body or pouch portion, or one or more battery tabs, as shown in patent applications to the present application. And the technology can be used with any of a wide variety of battery types, such as lithium-ion batteries, and prismatic battery, which can also be referred to as a prismatic cell, a prismatic cell battery, or a prismatic can cell. Or the battery can be a pouch-type battery including a pouch portion and tabs. The pouch portion can be referred to by other terms, such as a pouch section or, simply, a pouch.

The mechanically micro-heat exchanger, and each of the constituent substrate and fluid-transfer channel, is in various embodiments ductile or plastic, being configured to be physically changed easily by manual, machine, or tool manipulation from a first shape, for managing temperature of first structure, to a second shape, for managing temperature of a second structure. The mechanically conformable micro-heat exchanger is in various embodiments configured to be physically changed easily by manual, machine, or tool manipulation from a first shape, for managing temperature at a first position within or adjacent a subject structure, to a second shape, for managing temperature at a second position within or adjacent the same structure. By 'plastic,' here, is meant that the exchanger exhibits the quality of plasticity, having the ability to retain a shape to which it was changed, not that the exchanger is plastic (e.g., made from an organic polymers) in material.

In a contemplated embodiment, the exchanger does not include a substrate.

In contemplated embodiments, the mechanically conformable micro-heat exchanger is in various embodiments configured to be physically changed easily or readily by manual, machine, or tool manipulation from such a first shape to such a second shape in a reversible manner. The exchanger could be configured so that after being changed to the second shape, it could subsequently be changed to a third shape or back to the first shape for instance.

In contemplated embodiments, the mechanically conformable micro-heat exchanger is in various embodiments non-elastic, being configured to be physically changed easily by manual, machine, or tool manipulation from such a first shape to such a second shape, and maintain the second shape, at least until the exchanger is further deformed by a user.

In various embodiments, the flexible substrate includes pores, holes, voids, or recesses (not shown in detail). In some cases, the voids are filled with a material, such as a polymer or other material that can withstand temperatures that the subject component to be temperature controlled or exchangers will be exposed or reach.

The micro heat-transfer channels are in various embodiments deposited or otherwise connected to the substrate via bonding or other connector using an intermediary material. The connector in some cases includes a mechanical fastener or adhesive. In various embodiments, the connectors includes ductile polymer, such as a flexible silicon, which can flex or bend with flexing or bending of the substrate. The channel(s) can be deposited or otherwise connected to the substrate in any of a variety of ways, such as using a Micro-Electro-Mechanical-Systems (MEMS) or MEMS-type fabrication technique.

In various embodiments, the technology includes a flexible micro-heat exchanger integrated into a battery body or pouch, positioned adjacent a battery, and/or installed inside of a battery.

In some implementations, the flexible micro-heat exchanger includes one or more heating or cooling fins, protrusions, or appendages, cooling the component at one or more select locations. The exchanger for these implementations can include fins or be shaped to include one or more fins, protrusions, or appendages to promote desired heat transfer—i.e., into or away from the subject component. The substrate or a portion thereof can be arranged in a folded-fan configuration (not shown in detail), for instance. In some of these embodiments, the flexible heat-transfer fluid channel bends to conform to the folds of the substrate.

Other aspects of the present technology will be in part apparent and in part pointed out hereinafter.

Figure 1:
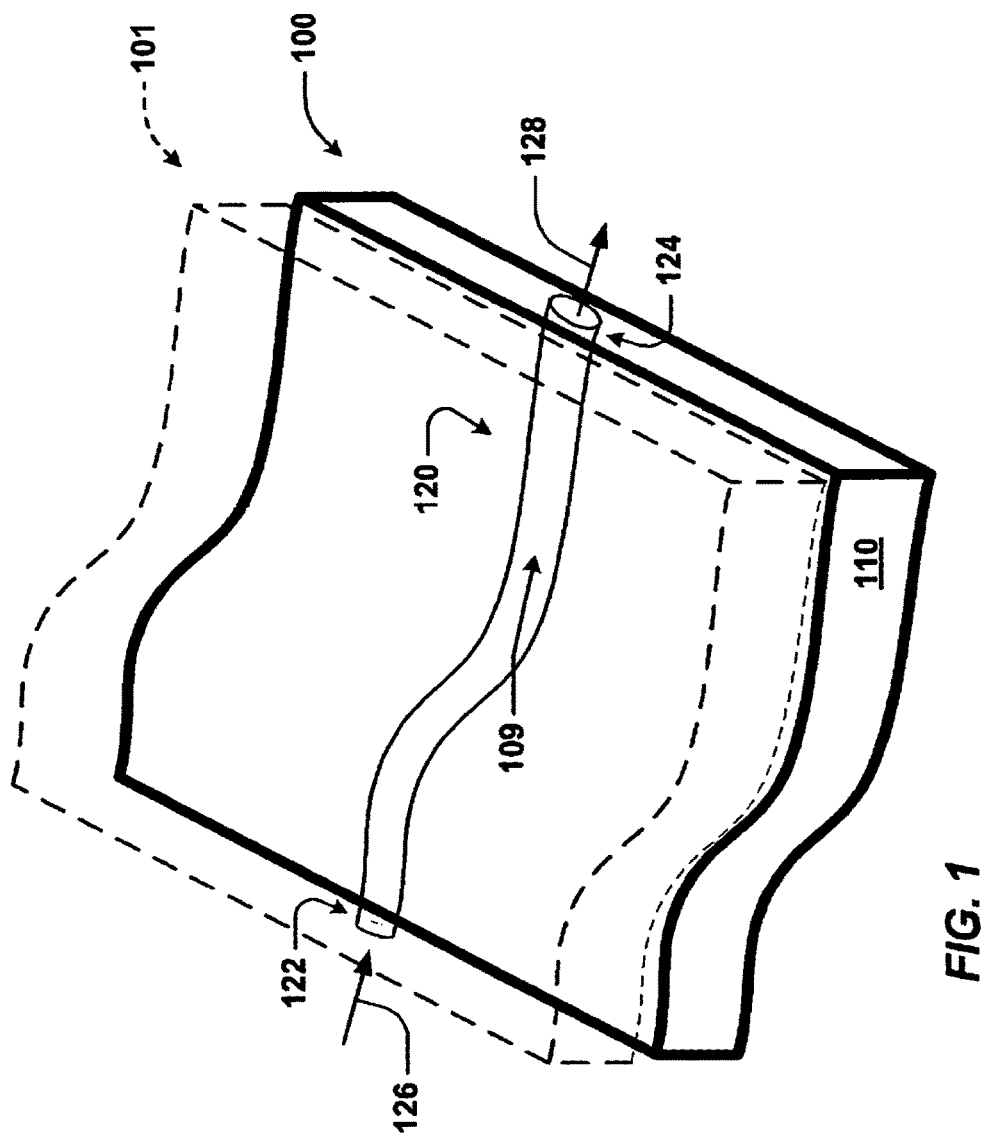
FIG. 1 illustrates a perspective view of an example mechanically conformable micro-heat exchanger according to the present technology.

The figures are not necessarily to scale and some features may be exaggerated or minimized, such as to show details of particular components.

In some instances, well-known components, systems, materials or methods have not been described in detail in order to avoid obscuring the present disclosure.

DETAILED DESCRIPTION

While select examples of the present technology describe transportation vehicles or modes of travel, and particularly with respect to batteries and lighting systems (e.g., LED systems) of automobiles, the technology is not limited to being used in connection with vehicles, or with lighting or battery systems.

As examples, the mechanically conformable micro-heat exchanger can be used in any of the situations in which micro-heat exchangers are used in the three parent applications to the present application.

The concepts can be used in a wide variety of applications, such as in connection with managing thermal conditions of other subject structures, such as components of aircraft, watercraft, and non-transportation machines, such as construction equipment, manufacturing equipment—welding or laser equipment (e.g., weld or laser head or application unit), for instance, manufacturing workpieces (e.g., workpieces being welded together), and consumer goods and appliances, as just a few examples.

I. General Overview of the Disclosure

The present disclosure describes a mechanically conformable micro-heat exchanger for use in managing temperature of a subject component. The exchanger includes a flexible fluid tube. In various embodiments, the tube is connected to a flexible substrate, such as by a flexible polymer. The exchanger can be changed manually from an initial shape to a first shape to conform to a shape of the subject component. The flexible fluid tube is configured to channel heat-transfer fluid through a heat-transfer tube section of the tube. The heat-transfer fluid is configured to cool or heat the subject component when, in operation of the mechanically conformable micro-heat exchanger, the heat-transfer fluid is channeled through the heat-transfer tube section.

The mechanically conformable micro-heat exchangers, or at least thermal-transfer components thereof, are positioned in or on subject components for selectively cooling or heating the components. The mechanically conformable micro-heat exchangers are configured so that their shape can be readily changed, such as by manual manipulation, to match a geometry of the subject component.

In various embodiments, the systems comprise flexible components allowing the systems to be positioned snugly against any of multiple, distinctly shaped, components to be temperature controlled, such as a battery system, a lighting system, or manufacturing system or workpiece.

Example thermal-transfer components include channels for cooling and/or heating.

In one embodiment, the technology involves an integrated microelectromechanical (MEM) device being part of, or positioned in or on, a battery component. The device can include or be referred to as a mechanically conformable micro-heat exchanger (MHE). The term mechanically conformable micro-heat exchanger is used primarily herein.

Mechanically conformable micro-heat exchangers in various embodiments use a custom-made or pre-selected fluid, such as a nanofluid, or a microfluid, having desired characteristics. A microfluid can be described as a fluid comprising micro-sized particles (including smaller, e.g., nano-sized), or simply fluids capable of effective movement through micro channels (including smaller).

Characteristics of the fluid can include, for instance, super heating and/or super cooling, or an ability to absorb, carry, and/or deliver heat with much greater efficiency than conventional materials, such as traditional automotive engine coolant regarding cooling functions.

The mechanically conformable micro-heat exchanger fluid can be distributed within the system in any of a wide variety of methods without departing from the scope of the present technology, including using any of valves, switches, and manifolds.

The fluid can be moved within the mechanically conformable micro-heat exchanger actively, such as by pump, pull or vacuum, and/or what can be referred to as passively, or less active, such as by capillary action, convection, gravity, or heat-gradient currents, or a combination of any of these. Passive motivation can be controlled in any of various ways including, for example, by adjusting a surface tension of the heat exchange fluid and/or by other forces such as gravity.

Figure 2:
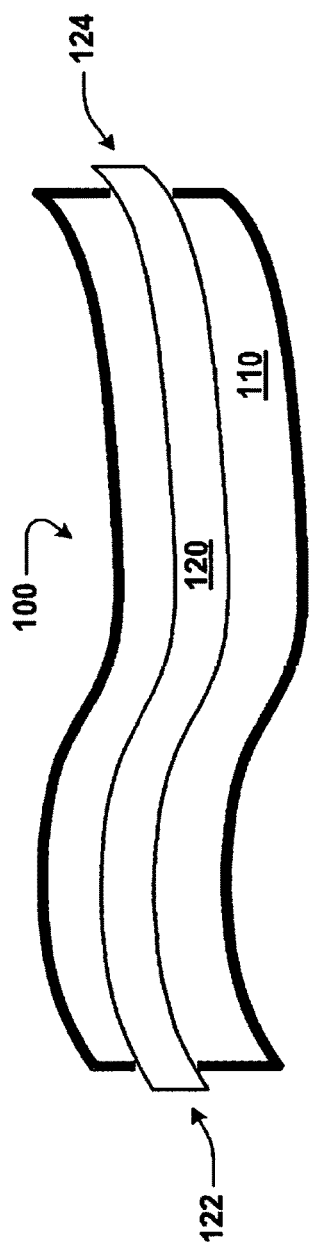
FIG. 2 illustrates a cross section of the exchanger of FIG. 1.
Figure 3:
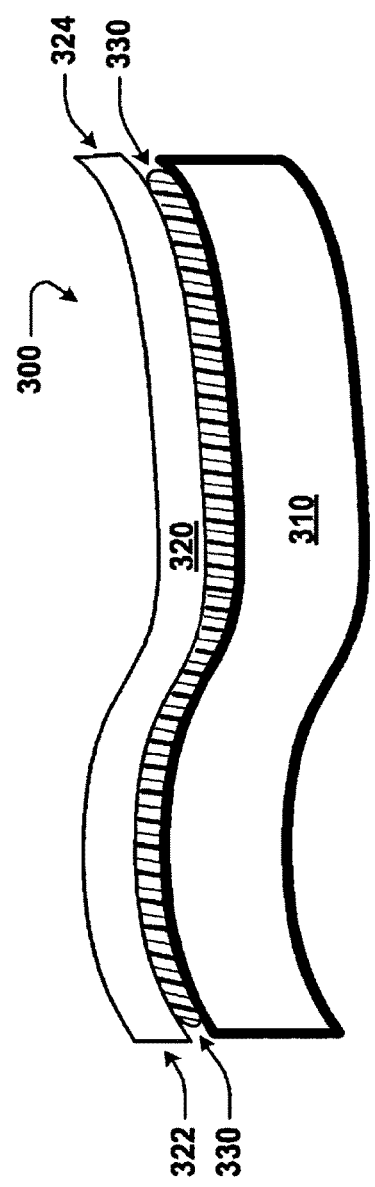
FIG. 3 illustrates the system including or connected to a fluid-modification arrangement according to embodiments of the present technology.

II. FIGS. 1-3 Conformable Micro-Heat Exchanger, Generally

Now turning to the figures, and more particularly the first figure, FIG. 1 illustrates schematically a perspective view of an example thermal-management system comprising a mechanically conformable micro-heat exchanger 100 according to the present technology.

The conformable micro-heat exchanger 100 includes a mechanically or physically flexible substrate 110 and a mechanically or physically flexible heat-transfer tube or channel 120.

The exchanger 100 can include any one or more of a wide variety of materials without departing from the scope of the present disclosure. Material must be configured to accommodate the fluid temperatures and any other effects to which the exchanger 100 may be exposed, such as thermal energy directly or indirectly from an automotive battery in operation.

Although the substrate 110 can include any of a variety of materials, in various embodiments the substrate 110 includes any of a flexible or ductile silicon or other polymer. The material of the substrate 110 in various embodiments is highly conductive to promote transfer of heat to or from the heat-transfer channel 120. In contemplated embodiments, the substrate 110 is insulative, such as for embodiments (reference the configuration of FIG. 2) in which the fluid-transfer channel 120 is on an outside of the substrate 110 and, in operation of the exchanger 100, the tube 120 is positioned in contact with a subject component 101 to be temperature controlled—e.g., cooled or heated.

As mentioned, the substrate 110 can include pores, grooves, depressions, or other voids of material (not shown in detail). The voids are in various embodiments unfilled, or filled with a material being ductile or flexible and able to withstand the temperatures and temperature gradients that the exchanger 100 is expected to be exposed to in operation. For various implementations, the filler can include any of a wide variety of polymers, for instance. Voids provide benefits including contributing to a flexible nature of the exchanger 100, and particularly the substrate 110. The substrate would be less flexible, for instance, if the same material were used and the pores were not present, or if the pores were filled with a more rigid material. In various embodiments, the voids contribute to flexibility and the substrate can still transfer heat effectively to and/or from the heat-transfer channel 120 via substrate material, including at least the substrate material outside of the voids.

The conformable micro-heat exchanger 100 in various embodiments includes multiple substrates connected to each other (not shown in detail).

In contemplated embodiments, the conformable micro-heat exchanger 100 does not include a substrate. It includes the flexible fluid-transfer channel(s) 120.

And while the flexible fluid-transfer channel(s) 120 can include any of a variety of materials, the fluid-transfer channel(s) 120 includes a flexible or ductile silicon, other polymer, or other conductive material that can be readily changed in shape and highly conductive to promote transfer of heat to or from the heat-transfer tube 120. As other examples, the mechanically flexible heat-transfer fluid channel 120 can include silicon, steel, copper, aluminum, etc.

The fluid tube or channel 120 can have any of a variety of shapes and sizes. As an example, in various embodiments the channel 120 is generally round, rounded (e.g., oval), square or otherwise rectangular in cross section, has more than one of these shapes at various places, or has any other suitable geometry.

Regarding size, in various embodiments the mechanically flexible fluid channel 120 has an outside diameter 105 of between about 1 μm and about 100 μm. While the fluid channel 120 can have other wall thicknesses, in one embodiment the fluid channel 120 has a wall thickness of between about 10 nm and about 1000 nm.

One benefit of the fluid channel 120 being relatively small and having sufficient wall thickness for robust operation is that the channel 120 will not collapse in use.

The thermal-management system can also be referred to by other descriptive terminology, such as a thermal-control system, a temperature-control system, a temperature-management system, or the like.

Figure 4:
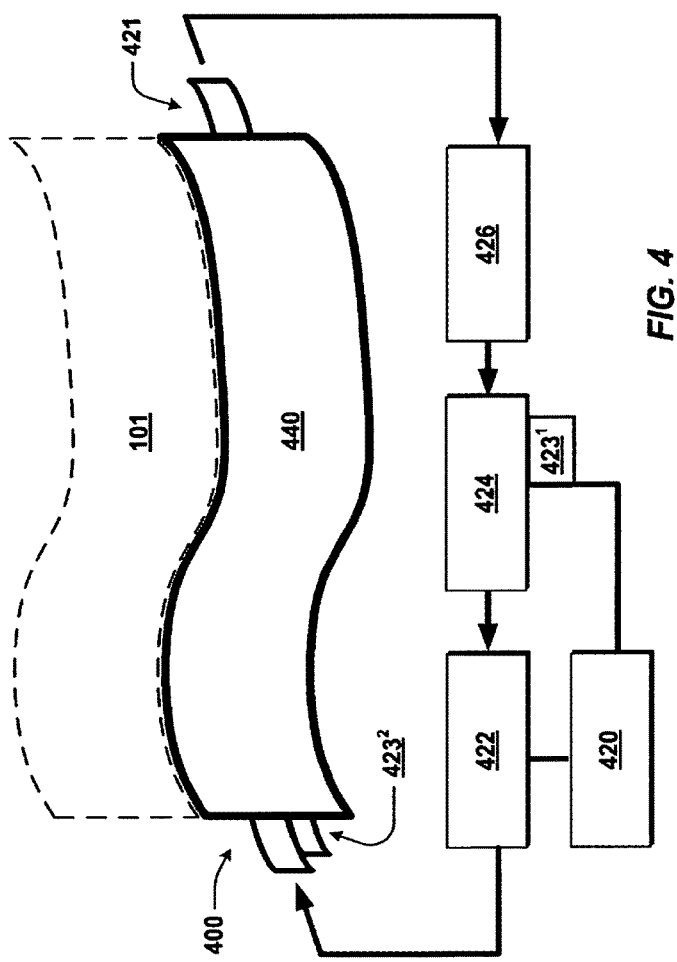
FIG. 4 illustrates an example controller, or computing architecture, being part of or used with any of the systems described herein.

The thermal management system includes the exchanger 100 and any of a wide variety of other structures, such as the subject component 101 to be temperature controlled and structures of a fluid-modification arrangement, such as that shown in FIG. 4.

Any of the features (systems, devices, sub-systems, components, etc.) described herein can be combined or separated in manufacturing or delivery, such as to be delivered and/or sold separately or together, such as in a kit. In one embodiment, the thermal-management system or exchanger 100 and the subject component(s) 101 to be temperature controlled are considered a part of a single apparatus. For instance, a company can manufacture the subject component(s) for receiving, connecting to, or being contacted by the exchanger 100. The same or a different entity can provide the thermal-management system or exchanger 100 with a conventional or specially designed subject component 101, such as a specially designed battery, either as a kit for assembly and use, or already assembled, or provide the thermal-management system or exchanger 100 separately from the subject component 101.

The term mechanically conformable micro-heat exchanger (MHE) in various embodiments refers to the entire thermal management system, or particularly to components of the thermal-management system—e.g., fluid channels 120 positioned within and/or otherwise on or in the system.

According to one perspective, the mechanically conformable micro-heat exchanger of the thermal-management system or conformable micro-heat exchanger is considered to include primarily the micro fluid channeling 120.

The exchanger 100 further includes at least two fluid openings or orifices 122, 124. The fluid orifices 122, 124 may be outfitted with input/output components—washers, ports, alignment parts, etc. (not shown in detail). At least one of the orifices 122, 124 can be used for fluid input and the other 122, 124 for output. In a contemplated embodiment, the thermal-management system or exchanger 100 comprises a vent—e.g., air vent (not shown in detail), such as on the flexible fluid channel 120, to facilitate movement of fluid into, though, and/or out of the flexible fluid channel 120, such as by relieving pressure build up that would otherwise impede fluid flow.

The input and output components 122, 124 of this embodiment, as with all input and output components herein, can take any of a wide variety of forms without departing from the scope of the present technology. The components may include valves, ports, manifold arrangements, couplings, combinations of these, or similar features.

Further regarding size of the mechanically flexible heat-transfer fluid channel 120, in one embodiment the channel 120 extends between the input 122 and the output 124 with a length dependent on the size of the subject component 101 to be temperature controlled—such as a battery, workpieces being joined (e.g., welded), lighting system (e.g., LED component), etc.

For cooling functions, the fluid channel 120 is filled with a cooled fluid, such as a chilled nanofluid. For heating functions, the fluid channel 120 is filled with a heated fluid, again such as a heated nanofluid. In a contemplated embodiment, the same fluid is used for heating and cooling, in turn, in the same mechanically conformable micro-heat exchanger for selectively heating (e.g., at cold-temperature starts for automobiles) and cooling (e.g., during extended electric vehicle use) regarding the example of a battery as the subject component 101.

The thermal-management fluid is referenced by number 109 in FIG. 1 and its flow is indicated schematically by arrows leading into and out of the fluid channel 120, and labeled by reference numerals 126, 128.

Any of a wide variety of fluids can be used with the present technology. Example fluids include nanofluids or microfluids engineered to have desired characteristics for use in the present mechanically conformable micro-heat exchanger. Example fluids are described further in the 'Example Fluid Engineering and Types' section (section V.), below.

While nanofluid is described primarily as the applicable fluid 109 herein, any embodiment described can be implemented with another appropriate fluid configured to achieve the stated purposes and goals, such as a microfluid engineered to have desired features, including ability to be heated, super heated, chilled, or super chilled, for use in heating or cooling the subject component 101 to be temperature controlled according to the present technology.

The chilled nanofluid 109 can be referred to as 'cold nanofluid,' or simply as a chilled or cold fluid to accommodate use of other appropriate fluids. Make-up, chilling, flow, and other features for the cold fluid are provided below. Similarly, heated nanofluid 109 can be referred to as 'hot nanofluid,' or simply as a heated or hot fluid. Make-up, heating, chilling, flow, and other features associated with the fluid are provided below.

The nanofluid 109 (or other suitable fluid) can be cooled to any appropriate temperature for the implementation. Various considerations for determining a temperature or temperature range to cool the nanofluid 109 to or maintain it at can be considered. Example considerations include an amount and cost of energy required to obtain a target temperature. Another example consideration is a benefit or value of further cooling—e.g., avoiding chilling to or below a temperature below which there will be small or diminishing relative returns.

In some implementations, the nanofluid 109 is cooled and controlled so as not to fall below a predetermined minimum temperature and/or so as not to rise above a predetermined maximum temperature—e.g. to stay within a pre-set, target range for the chilled fluid.

In some embodiments, the nanofluid 109 is cooled to a temperature determined as a function of one or more factors. The factors can include a crystallization rate, or freezing point for a component of the exchanger 100 or the subject component 101 to be temperature controlled.

The mechanically conformable micro-heat exchanger 100 can include or be associated with heating equipment, to heat the nanofluid 109 as desired. The equipment can be a part of fluid reservoirs, for example. In one embodiment, the heating equipment is controlled by circuitry, such as by the controller 420. The reservoirs are described further below in connection with FIG. 3.

The nanofluid 109 can be pre-heated to any appropriate temperature for the application. Various considerations for determining a temperature or temperature range to heat to or maintain, can be processed, as with cooling implementations. Example considerations for heating include an amount and cost of energy required to obtain a target temperature, and the value of further thermal adjustment, such as heating—e.g., avoiding heating the subject component 101 to be temperature controlled too long during freezing-weather start up, and to a temperature above which there will be small or diminishing relative returns.

In some implementations, the nanofluid 109 is heated and controlled so as not to rise above a predetermined maximum temperature and/or so as not to fall below a predetermined minimum temperature—e.g. to stay within a pre-set, target range for the heated fluid.

In some embodiments, the nanofluid 109 is heated to a temperature determined as a function of one or more factors. Factors can include, for example, a melting point of one or more components of the subject component 101 or system 100, or the melting point minus a factor such as a percentage of the melting point or a pre-set off-set temperature value.

The nanofluid 109 (or other suitable fluid) can be moved through the mechanically conformable micro-heat exchanger 100 in any of a variety of ways including by one or more ways, which can be referred to as active and passive, or less active, as mentioned above. Example active means include pushing or pulling, such as by an upstream or downstream pump. Example passive, or less-active, means include using capillary action, convection, gravity, or heat-gradient currents, or a combination of any of these.

Nanofluid 109 can be added to and/or moved through the system according to any appropriate timing. One goal of replacing, or replenishing the nanofluid 109 is maintaining a desired—e.g., predetermined—in-system fluid temperature and/or other fluid characteristics. Replenishing nanofluid could be used to maintain or keep a general desired or target temperature of the fluid 109 in the channel(s) 120, for example. Other fluid characteristics that can be controlled, such as magnetic polarity, are described below.

In various implementations, the nanofluid 109 is added and removed generally continuously to refresh the nanofluid 109 in the channel(s) 120 with fluid of the desired characteristic(s), for heating or cooling the subject component 101, to maintain the desired mechanically conformable micro-heat exchanger 100 temperature as desired—e.g., as predetermined.

In various embodiments, some or all of the fluid control described is automated. The automated features may include, for instance, selectively heating or cooling the nanofluid 109, and selectively causing the nanofluid 109 to flow into or out of the mechanically conformable micro-heat exchanger 100, and at desired volumes, flow rates, temperature, and/or other characteristic(s) associated with the fluid.

For embodiments in which flow of the fluid 109 results at least partially from capillary action, the flow can controlled at least in part by, for example, adjusting a surface tension of the heat exchange fluid 109, such as a surface tension in the reservoir described more below.

As mentioned, the nanofluid 109 can also be modified in terms of temperature and in other ways, by automated machinery and/or personnel using tools. Example modifications include changing a magnetic polarity of the nanofluid 109, changing the type or types of nanoparticles in the nanofluid 109, or by changing a concentration of any of the types of nanoparticles in the fluid 109, by adding or removing nanoparticles or base fluid to/from the nanofluid 109. The modification can thus include changing an effective ratio of fluid components, such as of base fluid to nanoparticles.

FIG. 2 shows an example side or side cross-sectional view of the mechanically flexible and conformable micro-heat exchanger 100 of FIG. 1.

FIG. 3 shows another side or side cross-sectional view, of another mechanically flexible and conformable micro-heat exchanger 300. The exchanger 300 of FIG. 3 represents embodiments by which some or all of a fluid-transfer portion of the fluid-transfer tube or channel 320 is positioned outside of, or on an exterior surface of, the substrate 310. The substrate 310 can in any ways be analogous or different than the substrate 110 described regarding FIG. 1.

In FIG. 3, an inlet and outlet 322, 324 are called out.

As mentioned, the micro heat-transfer channels 320 are in various embodiments deposited or otherwise connected to the substrate 310 via bonding or other connector 330 using an intermediary material. The connector 330 in some cases includes a mechanical fastener or adhesive. In various embodiments, the connectors 330 includes ductile polymer, such as a flexible silicon, which can flex or bend with flexing or bending of the substrate. The channel(s) 320 can be deposited or otherwise connected to the substrate 310 in any of a variety of ways, such as using a Micro-Electro-Mechanical-Systems (MEMS) or MEMS-type fabrication technique.

III. FIG. 4 Fluid-Modification and Controller System(s)

Example fluid-modification and automated features are indicated schematically in FIG. 4. The features include a controller 420.

The conformable micro-heat exchanger is indicated schematically and referenced in FIG. 4 by numeral 400, representing any of the exchanger configurations (e.g., 100, 200) shown and described herein.

The controller 420 is configured and arranged for communication with other components such as a pump 422 and/or a fluid-modification device (FMD) 424. The configuration and arrangement of the controller 420 can include wired or wireless connection(s) to the pump 422 and/or FMD 424.

Fluid control can include monitoring of fluid characteristic, as mentioned, such as by closed-loop feedback. For instance, at least one sensor monitoring fluid temperature and/or other fluid characteristic (e.g., magnetic polarity, ratio of nanoparticles and base fluid) can be implemented at any of various portions of the arrangement. Example locations include any one or more of: an outlet of the FMD 424 (reference numeral 423[1]) an inlet of the FMD, and inlet to a reservoir 426, an outlet of the reservoir 426, an inlet of the exchanger (reference numeral 423[2]), and an outlet of exchanger 100. The feedback loop can have benefits for the controller including advising whether the FMD 424 is performing as it is being instructed to perform, whether the controller 420 is sending proper signals or should send different signals—e.g., a signal to heat more or change fluid composition in a different manner. The feedback can also promote efficiency, such as when the sensor is at the FMD inlet, in that the controller 420 can consider a particularly what change(s) need to be made to the fluid at the FMD 424 to reach a target fluid characteristic(s) pre-determined at the controller 420—e.g., target temperature and/or composition.

The controller 420 is described further below, in next section IV, describing an example controller in the form of a hardware-based computing system 500 shown schematically in FIG. 5.

The mechanically conformable micro-heat exchanger 400 can include or be connected to the reservoir 426, holding the nanofluid 109 before and/or after it leaves the system channel(s) 120.

In some embodiments, the mechanically conformable micro-heat exchanger 100 includes or is connected to more than one reservoir 426. The reservoir 426 can hold the same or different types of nanofluids 109. The reservoirs 426 could also, whether holding the same or different types of nanofluid, maintain the nanofluids 109 at different temperatures. One of the reservoirs 426 could be a location at which chilled fluid is kept and/or fluid is chilled (at-reservoir chiller not shown in detail). One of the reservoirs 426 could be a location at which heated fluid is kept and/or fluid is heated (at-reservoir heater not shown in detail).

The reservoir 426 is a location where the nanofluid 109 can be added, removed, or replaced in mass. The nanofluid 109 can be added, removed, or replaced in various manners, such as partially or in total, at one time or over a period of time.

The nanofluid 109 can also be adjusted by the mentioned fluid-modification device (FMD) 424. The FMD 424 can include can include a heater and a chiller being part of or connected to cold and hot reservoirs 426, respectively. The FMD 424 can be integrated with, or as part of, the reservoir 426, or vice versa.

As mentioned, any component shown by a single item in the figures can be replaced by multiple such items, and any multiple items can be replaced by a single item. Here, for instance, though a single pump 422 is shown, the mechanically conformable micro-heat exchanger 400 can include or be connected to more than one pump 422.

Further regarding the FMD 424, it can be configured to alter the nanofluid 109 in any of a variety of ways toward accomplishing goals of the present technology. As mentioned, the FMD 424 can include, e.g., a heater, or heating device, a chiller, or cooling device to heat or cool nanofluid 109 passing through the FMD 424 to a specified temperature before it is pumped or otherwise caused or allowed to flow into the channel(s) 421 of the mechanically conformable micro-heat exchanger 100.

In one embodiment, the FMD 424 includes a material-adjusting component for changing a make-up or characteristic of the nanofluid 109, other than by only heating, or only cooling. The material-adjusting component can be configured to, for example, alter the nanofluid 109 in one or more ways, such as by changing a magnetic polarity of the nanofluid 109, changing the type or types of nanoparticles in the nanofluid 109, or by changing a concentration of any of the types of nanoparticles in the fluid 109, by adding or removing nanoparticles or base fluid to/from the nanofluid 109, to obtain desired qualities.

In embodiments in which the FMD 424 illustrated represents more than one FMD 424, or an FMD 424 with various functions (e.g., fluid heating and polarity change), the FMD 424 can include, for instance, one or both of a chiller and a material-adjusting component.

The mechanically conformable micro-heat exchanger 100 includes any appropriate piping, valves, switches, and the like for directing the nanofluid 109 between the various components described in operation of the mechanically conformable micro-heat exchanger 100.

With continued reference to FIG. 4, the intake, outtakes 422, 124 and channel(s) 421 can vary in design. The intake, outtakes 122, 124 can be, for example, of any number, size, shape, and position within the mechanically conformable micro-heat exchanger 400 without departing from the scope of the disclosure A designer of the system can engineer the fluid channel 421 in any of a wide variety of shapes, geometries, and patterns to achieve desired goals, including, for instance, heat-distribution, heat-absorption, or heat-delivery goals within the mechanically conformable micro-heat exchanger 400.

In some embodiments, as shown in patent applications to the present application, at least a portion of the fluid channel(s) is generally serpentine, or winding. A benefit of this arrangement is that more of the channeling is adjacent more of a relevant body or surface of the subject component 101 needing temperature change.

Other example distributions for the fluid channeling include cross-hatched pattern, a pin pattern, and a spiral or helicoid pattern. Other examples include manifold, single/multiple serpentines, parallel, and interdigitated.

The mechanically conformable micro-heat exchanger 400 can include or be associated with chilling equipment, to cool the nanofluid 109 as desired. The equipment can be a separate device, such as the FMD 424 as shown in FIG. 4, or such device can be a part of the reservoir 426, as mentioned, for example. In one embodiment, the chilling equipment is controlled by circuitry, such as by the controller 420.

As provided, the mechanically conformable micro-heat exchangers of the present technology can be configured for use in cooling and/or heating vehicle batteries. Keeping a subject component to be temperature controlled operating as much as possible in its optimal temperature range has benefits, including greater subject component to be temperature controlled energy densities, because a subject component to be temperature controlled operated in its optimal temperature range delivers greater performance.

Heating a subject component to be temperature controlled is advantageous in situations such as cold-weather use of the subject component to be temperature controlled. Heating a subject component to be temperature controlled quickly at startup in cold weather, for example, improves subject component to be temperature controlled performance, because batteries tend to otherwise lose performance when operated at very cold temperatures, e.g., ambient, outside environment temperatures of 0 degrees Celsius or less.

Managing batteries in manners according to the present technology, using mechanically conformable micro-heat exchangers, has particular benefits including, by being a relatively smaller cooling and/or heating system, allowing for a more powerful, robust subject component to be temperature controlled, by freeing up space for more subject component to be temperature controlled cells in the subject component to be temperature controlled pack. A result of the improved density is longer subject component to be temperature controlled use on a charge and so longer range electric vehicles. Other benefits of the present technology are described below.

In various embodiments, the exchanger can include inputs and outputs, such as inputs 122, 124 positioned on different sides (FIG. 1) or generally the same side (e.g., top in the perspective of FIG. 2) of the exchanger and/or of the subject component 101 (as shown in patent applications to the present application).

The mechanically conformable micro-heat exchanger channeling can thus include a single channel that changes directions, forming two parts or two channels connected.

In various embodiments, the heat-transfer fluid channel(s) is positioned primarily on or at a surface of the subject component 101, for operations of the system, such as a temperature controlled battery cell, as shown in patent applications to the present application. As mentioned, fluid channels can be partially or fully within the subject component to be temperature controlled component 101 and so the MHE fluid channel(s) can in contemplated embodiments be embedded partially or fully below the surface of the subject component 101.

The mechanically flexible heat-transfer fluid channel(s) is in some embodiments distributed on or at the surface of the exchanger 100 and/or subject component 101 in any effective pattern, such as by being distributed in generally a coiled, helicoid, spiral, curled, or winding, shape, as shown in patent applications to the present application.

IV. FIG. 5 Hardware-Based Control Unit

Figure 5:
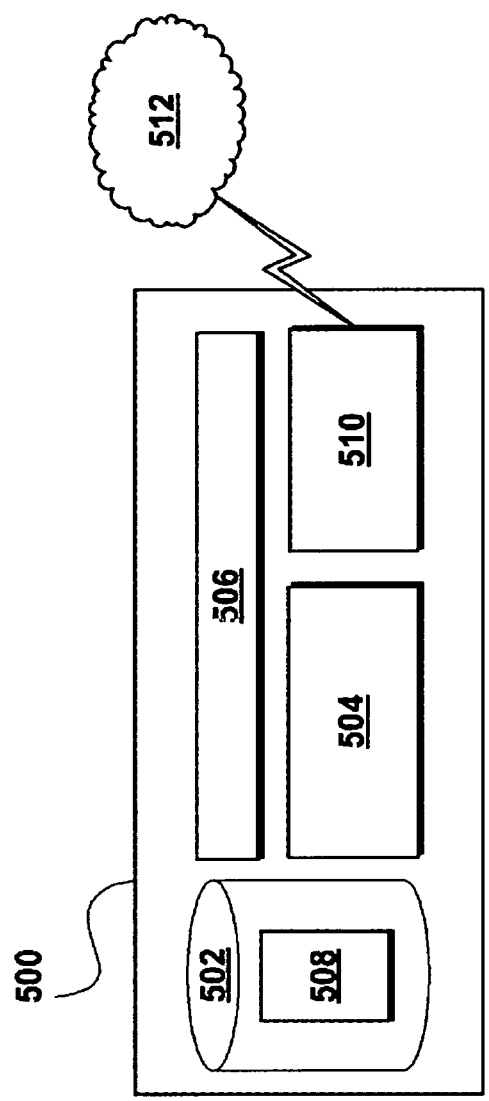
FIG. 5 illustrates an example hardware-based controls system for use with the present technology.

FIG. 5 illustrates an example hardware-based controls system 500. The system can be referred to by other terms, such as controller, computer, computing device, the like, or other. The controls system 500 is part of or used with any of the apparatus described herein. The controls system 500 can consist of or constitute the controller 420, described above.

The controls system 500 includes a memory, or computer-readable medium 502, such as volatile medium, non-volatile medium, removable medium, and non-removable medium. The term computer-readable media and variants thereof, as used in the specification and claims, refer to tangible, non-transitory, storage media.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The controls system 500 also includes a computer processor 504 connected or connectable to the computer-readable medium 502 by way of a communication link 506, such as a computer bus.

The computer-readable medium 502 includes computer-executable code or instructions 508. The computer-executable instructions 508 are executable by the processor 504 to cause the processor, and thus the controller 500, to perform any combination of the functions described in the present disclosure.

Example functions or operations described include controlling a temperature of nanofluid being introduced to the thermal-management system of any of the embodiments shown and described. Another example function is changing nanofluid composition in a pre-determined manner to expedite or otherwise effect as desired a heating or cooling process. Another example function includes controlling a flow or flow rate by which the nanofluid is caused to flow through any of the example thermal management systems described or shown.

The code or instructions 508 can be divided into modules to perform various tasks separately or in any combination. The module can be referred to by any convenient terminology. One module, configured with code to control one or more characteristics of the nanofluid using an FMD, could be referred to as a fluid-modification module, a fluid-characteristic-control module, or the like, for instance.

The controller 500 can also include a communications interface 510, such as a wired or wireless connection and supporting structure, such as a wireless transceiver. The communications interface 510 facilitates communications between the controller 500 and one or more external devices or systems 512, whether remote or local.

The external devices 512 can include, for instance, a remote server to which the controls system 500 submits requests for data and/or from which the controls system 500 receives updates or instructions. The external device 512 could include a computer from which the control system 500 receives operating parameters, such as a target temperature(s) or target composition(s) for the nanofluid(s), changes that need to be made to meet the target(s), other characteristics for or related to the fluid, cooling times, nanofluid flow rates or flow/switch timing, or another system characteristic.

V. Example Fluid Engineering and Types

The present technology in various embodiments includes or is used with any of a wide variety of thermal-management (e.g., heating and/or cooling) fluids, as mentioned. Example fluids include nanofluids and microfluids engineered to have desired characteristics for use in the mechanically conformable micro-heat exchangers disclosed herein.

Nanofluids are engineered colloidal suspensions of nanometer-sized particles in a base fluid. The nanoparticles are typically metals, oxides, carbides, or carbon nanotubes. Example base fluids include water, ethylene glycol, and oil.

Nanofluids are made to have unique properties, such as super-heating and/or super-cooling characteristics. A nanofluid could be engineered to have a thermal conductivity and convective-heat-transfer coefficient that are greatly enhanced over that of the base fluid, alone, for example. Engineering the fluid can include, for instance, magnetically polarizing the nanoparticles to obtain the desired qualities.

While the nanofluid can include other nanoparticles without departing from the present disclosure, in various embodiments, the nanofluid includes one or a combination of silicon nanoparticles and metal-based nanoparticles.

The nanofluid is for some implementations, surface functionalized. Surface functionalization of nanoparticles involves introducing functional groups (e.g., OH, COOH, polymer chains, etc.) to a surface of a nanoparticle. One characteristic of surface-functionalized nanofluids is increased particle dispersion in the nanofluid, which can be beneficial because increased thermal capacity, increased dispersion of thermal energy, and increased longevity of nanoparticle suspension. Another result is that conductive nanoparticles can be isolated using surface functionalization, which can be beneficial because of increased control over particle density in the fluid.

As also mentioned, while nanofluids are discussed herein as the primary fluid for use in the present systems, other fluids able to perform as desired can be used. The fluids can include, e.g., microfluids, including micro-sized particles in a base fluid, or simply fluids capable of effective movement through micro channels, such as those of the micro channels of the present technology.

In various embodiments, the fluid includes a coolant, such as water or glycol. The coolant can include nano-sized particles, which increases the heat-transfer efficiency of the coolants.

VI. Select Benefits of the Present Technology

Many of the benefits and advantages of the present technology are described herein above. The present section restates some of those and references some others. The benefits are provided by way of example, and are not exhaustive of the benefits of the present technology.

The heat exchangers of the present technology are configure to conform to a surface of subject component to be thermally controlled. Materials are selected in various embodiments to withstand expected temperatures and temperature variants, such as silicon being used due to its relatively high heat-transfer capability.

In various embodiments, the systems comprise flexible components allowing the systems to be positioned snugly against any of multiple, distinctly shaped, components to be temperature controlled, such as a subject component to be temperature controlled system, a lighting system, or manufacturing system or workpiece.

In various embodiments, the systems comprise flexible components allowing the systems to be positioned snugly against any of multiple, distinctly shaped, components to be temperature controlled, such as a battery system, a lighting system, or manufacturing system or workpiece.

The temperature-control systems of the present technology do not take up a large amount of space, or add much weight, compared to other techniques for controlling temperature of target components.

A compact flexible micro device can be positioned on and/or integrated inside a battery cell, including battery cells having conventional external sizing and at least general geometry.

The present technology enables enhanced integrated battery cell cooling and/or heating by way of efficient thermal exchange during battery operation.

Another advantage of using a mechanically conformable micro-heat exchanger of embodiments of the present technology is that channels of the exchanger will not collapse due at least in part to their relatively small size, or size and geometry.

The present technology also improves, or allows for improved, battery energy density because a battery operated in its optimal temperature range delivers greater performance and a physically smaller heating and/or cooling system allows for more battery cells in the battery pack. A result of the improved density is longer battery use on a charge and in the automotive industry, for example, longer range electric vehicles.

The present technology also simplifies battery assembly at the plant or manufacturing level because the heating and/or cooling system could be integrated into the cells themselves. Thereby, for instance, work and time can be saved by a manufacturing company in not having to install ancillary cooling or heating equipment for the battery, the notably lower amount of componentry provided by the present technology.

The present technology also reduces vehicle or product weight associated with battery cooling and/or heating, and saves space. Relatively weighty and bulky conventional cooling structures are not needed.

Improved thermal management of structures requiring temperature control such as vehicle batteries, has benefits including allowing design and use in vehicles of batteries having higher energy densities, allowing design and use of larger batteries, and facilitating higher performance from existing batteries.

Flexibility in geometry of the present systems allow effective use in connection with many more components to be temperature controlled as compared with any brittle or statically shaped alternative systems.

The technology in some embodiments facilitates, or is an enabler for, welding (e.g., laser welding) together dissimilar materials, such as dissimilar metals, by being able to control temperature at target surfaces or portions of the welding equipment and/or of one or multiple workpieces being joined. The improved temperature management afforded inhibits intermetallic growth, resulting in a more robust resulting joint or joints between workpieces.

The flexible heat exchanger can readily be used as part of a subject component, such as a part of a battery pouch for pouch-type battery cells.

The flexible heat exchanger can be used in manufacturing processes of workpieces, such as metal parts, having any of a wide variety of shapes or geometries—the technology is especially helpful for managing temperature of components that are not flat, or have bend or irregular surfaces to be cooled or heated.

Because the flexible heat exchanger can be form-fitted or conformed to the subject component, the exchanger, being conformed to the subject component, is closer to the component and less susceptible to breakage and also less susceptible to becoming disconnected from the component.

VII. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

Specific structural and functional details disclosed herein are not to be interpreted as limiting, but merely as a basis for the claims and as a representative basis for teaching one skilled in the art to variously employ the present disclosure.

Any component shown or described as a single item in the figures can be replaced by multiple such items configured to perform functions provided in connection with the single item. Similarly, any multiple items shown or described can be replaced by a single item configured to perform the functions provided in connection with the multiple items.

Directional references are provided herein mostly for ease of description and for simplified description of the example drawings, and the thermal-management systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface is referenced, for example, the referenced surface can, but need not be vertically upward, or atop, in a design, manufacturing, or operating reference frame. The surface can in various embodiments be aside or below other components of the system instead, for instance.

What is claimed:

1. A mechanically conformable micro-heat exchanger, for use in managing temperature of a subject component, comprising:
    a heat-transfer fluid including nanoparticles, the heat-transfer fluid being surface functionalized to, in operation, cool or heat a subject component in a predetermined manner;
    a physically flexible substrate configured to change shape easily by manual manipulation; and
    a physically flexible fluid tube being connected to the substrate and also configured to change shape easily by manual manipulation;

wherein:
    the nanoparticles of the heat-transfer fluid have more particle dispersion, or are more isolated, than nanoparticles of the heat-transfer fluid if not surface functionalized;
    the mechanically conformable micro-heat exchanger can be changed manually from an initial shape to a first shape to conform to a first-subject-component shape of the subject component;
    the fluid tube comprises a fluid-tube opening and a fluid-tube exit, and a heat-transfer tube section positioned between the fluid-tube opening and the fluid-tube exit;
    the fluid tube is configured to receive the heat-transfer fluid via the fluid-tube opening and channel the heat-transfer fluid, from the fluid-tube opening, through the heat-transfer tube section, and to the fluid-tube exit; and
    the heat-transfer fluid is configured to cool or heat the subject component when, in operation of the mechanically conformable micro-heat exchanger, the heat-transfer fluid is channeled through the heat-transfer tube section.

2. The mechanically conformable micro-heat exchanger of claim 1 wherein the physically flexible fluid tube is positioned at least partially within the physically flexible substrate.

3. The mechanically conformable micro-heat exchanger of claim 1 wherein the mechanically conformable micro-heat exchanger is configured to, when arranged in the first shape, contact more of the subject component than the mechanically conformable micro-heat exchanger would contact if arranged in the initial shape.

4. The mechanically conformable micro-heat exchanger of claim 1 wherein at least a portion of the heat-transfer tube section is positioned on an outer surface of the physically flexible substrate.

5. The mechanically conformable micro-heat exchanger of claim 4 wherein:
    the subject component includes or is a part of a battery system; and
    the heat-transfer tube section is configured and arranged so that said portion of the heat-transfer tube section contacts the part of the battery system directly when the mechanically conformable micro-heat exchanger is in the first shape and placed directly adjacent a part of the battery system.

6. The mechanically conformable micro-heat exchanger of claim 4 wherein:
    the subject component is a lighting component; and
    the heat-transfer tube section is configured and arranged so that said portion of the heat-transfer tube section contacts the lighting component directly when the mechanically conformable micro-heat exchanger is in the first shape and placed directly adjacent the lighting component.

7. The mechanically conformable micro-heat exchanger of claim 1 wherein the mechanically conformable micro-heat exchanger is generally inelastic, such that the mechanically conformable micro-heat exchanger does not automatically return to the initial shape after being changed to the first shape and after manual input is removed.

8. The mechanically comformable micro-heat exchanger of claim 1 wherein:
    the physically flexible fluid tube is a first physically flexible fluid tube; and the mechanically comformable micro-heat exchanger comprises a second physically flexible fluid tube connected to the substrate.

9. The mechanically conformable micro-heat exchanger of claim 1 wherein:
   the subject component is a battery cell;
   the battery cell has a first bus bar, a first battery tab and/or a first surface;
   the battery cell has a second bus bar, a second battery tab and/or a second surface;
   the physically flexible fluid tube is a first physically flexible fluid tube and, for operation of the mechanically conformable micro-heat exchanger, is positioned in direct contact with the first battery tab, the first bus bar, or the first surface of the battery cell; and
   the mechanically conformable micro-heat exchanger comprises a second fluid tube positioned in direct contact with the second battery tab, the second surface, or the second bus bar of the battery cell.

10. The mechanically conformable micro-heat exchanger of claim 1, wherein the heat-transfer fluid includes nanoparticles and the heat-transfer fluid is surface functionalized by addition of a functional group at a surface of the nanoparticles.

11. The mechanically conformable micro-heat exchanger of claim 1, wherein the heat-transfer fluid comprises silicon (Si) nanoparticles with a base fluid.

12. The mechanically conformable micro-heat exchanger of claim 1 wherein:
   the physically flexible fluid tube comprises a wall having a wall thickness of between about 10 nm and about 1000 μm; and/or
   the physically flexible fluid tube has an outside diameter between about 1 μm and about 100 μm.

13. The mechanically conformable micro-heat exchanger of claim 1 further comprising a fluid-modification device in fluid communication with the physically flexible fluid tube, the fluid-modification device being configured to, in operation of the mechanically conformable micro-heat exchanger, modify at least one characteristic associated with the heat-transfer fluid in a predetermined manner to, in operation of the mechanically conformable micro-heat exchanger, cool or heat the subject component more effectively than the heat-transfer fluid would if not modified.

14. The mechanically conformable micro-heat exchanger of claim 13 further comprising a computerized controller configured for wired or wireless communication with the fluid-modification device, and to send a signal to the fluid-modification device causing the fluid-modification device to modify said characteristic.

15. The mechanically conformable micro-heat exchanger of claim 13 wherein said characteristic comprises at least one of:
   a magnetic polarity of the heat-transfer fluid;
   a type of nanoparticles in the heat-transfer fluid;
   a concentration of nanoparticles in the fluid;
   a ratio of base fluid-to-nanoparticles of the heat-transfer fluid;
   temperature of the heat-transfer fluid; and
   flow rate of the heat-transfer fluid through the fluid tube.

16. The mechanically conformable micro-heat exchanger of claim 1, wherein the heat-transfer tube section of the physically flexible fluid tube is disposed in a predetermined pattern selected from a group consisting of:
   cross-hatched;
   a pin;
   a spiral or helicoid;
   manifold;
   serpentine;
   parallel; and
   interdigitated.

* * * * *